United States Patent [19]

Han et al.

[11] Patent Number: 5,078,818
[45] Date of Patent: Jan. 7, 1992

[54] METHOD FOR PRODUCING A FIBER-REINFORCED CERAMIC HONEYCOMB PANEL

[75] Inventors: Jong H. Han, San Leandro; Andreas G. Hegedus, San Francisco, both of Calif.

[73] Assignee: Hexcel Corporation, Dublin, Calif.

[21] Appl. No.: 510,510

[22] Filed: Apr. 18, 1990

[51] Int. Cl.$^5$ .............. C04B 35/76; C04B 35/84; B32B 18/00
[52] U.S. Cl. .............................. 156/89; 264/60; 427/376.1; 427/443.2
[58] Field of Search ............... 264/60, 62, 136, 137; 156/89; 427/376.1, 443.2

[56] References Cited

U.S. PATENT DOCUMENTS

| | | | |
|---|---|---|---|
| 3,766,000 | 10/1973 | Gibson et al. | 161/170 |
| 3,923,940 | 12/1975 | Hujii et al. | 264/59 |
| 4,017,347 | 4/1977 | Cleveland | 156/89 |
| 4,177,230 | 12/1979 | Mazdiyasni | 264/60 |
| 4,390,583 | 6/1983 | Brazel | 428/113 |
| 4,585,500 | 4/1986 | Minjolle et al. | 156/89 |
| 4,642,210 | 2/1987 | Ogawa et al. | 264/62 |
| 4,696,710 | 9/1987 | Minjolle et al. | 156/89 |
| 4,767,479 | 8/1988 | Ferguson | 156/89 |
| 4,822,660 | 4/1989 | Lipp | 428/113 |
| 4,828,774 | 5/1989 | Andersson et al. | 264/60 |

*Primary Examiner*—James Lowe
*Assistant Examiner*—Christopher A. Fiorilla
*Attorney, Agent, or Firm*—Townsend and Townsend

[57] ABSTRACT

Fiber-reinforced ceramic honeycomb is prepared by impregnating a high-temperature fiber, notably fibers of ceramic materials such as silicates, aluminosilicates, aluminates and silicon carbides, with a liquid solution or suspension of a ceramic precursor material, followed by forming the impregnated fiber into corrugated strips, assembling the strips into the honeycomb structure, then heating the strips to form the ceramic. Multiple impregnations with intervening heating are useful in controlling the density and quality of the product.

13 Claims, No Drawings

METHOD FOR PRODUCING A FIBER-REINFORCED CERAMIC HONEYCOMB PANEL

This invention lies in the fields of ceramic materials, fiber-resin composites and honeycomb structures.

BACKGROUND OF THE INVENTION

Honeycomb has long been known for use in structural elements which require a combination of lightness and strength. The use of ceramics for the honeycomb walls provides the further advantage of high temperature performance.

One existing method of forming ceramic honeycomb is by extrusion of ceramic precursor materials through dies which form the cellular array. The structures produced by this method are monolithic (single-phase) structures, which are brittle and thereby limited in the ease and degree with which they can be handled and further processed for use. The extrusion process also limits the size and shape of the piece.

Ceramic honeycomb of increased toughness has been formed by the use of a ceramic fiber tape embedded in ceramic material to form the honeycomb walls. The existing procedure to form such a structure involves incorporating a ceramic frit into the fiber tape, then forming the combination into the corrugated shape required for the honeycomb walls, then hot pressing this corrugated form to consolidate the frit into a matrix. This is all done prior to assembling the corrugated strips into the honeycomb structure. Unfortunately, the hot press limits the size of the part which can be formed in this manner and adds greatly to the cost.

SUMMARY OF THE INVENTION

It has now been discovered that fiber-reinforced ceramic honeycomb may be manufactured by the use of a liquid impregnant which is convertible to a ceramic material upon exposure to elevated temperature. A fabric tape or sheet formed of fibers of high-temperature material is impregnated with the liquid ceramic precursor, which contains either a preceramic polymer dissolved in a liquid vehicle, a colloidal suspension of a preceramic material, or any other suitable liquid form of a precursor. The impregnated tape or sheet is then heated to evaporate the vehicle, the tapes or sheets are formed into the corrugated shape and assembled in the honeycomb configuration, and the assembly is given a final cure to consolidate and solidify the ceramic into a solid continuous phase. The procedure entails essentially no shrinkage and is not subject to the size limitations inherent in procedures of the prior art.

Honeycomb panels and parts formed in accordance with this invention are useful in any application which requires high-temperature performance.

Further features, aspects, and advantages of the invention will be apparent from the description which follows.

DETAILED DESCRIPTION OF THE INVENTION AND PREFERRED EMBODIMENTS

The continuous ceramic phase formed by the impregnant in accordance with the practice of the present invention may be any ceramic material which can be formed into a continuous solid phase from a liquid precursor form. The choice of ceramic material is not critical and may include any of the wide variety of ceramic materials known in the ceramics art. The main classes of such materials are metal and non-metal oxides, borides, carbides, nitrides, sulfides and silicides.

Both naturally occurring and synthetic ceramic materials may be used, the naturally occurring materials including both clay-derived and non-clay-derived materials. Examples of minerals and compounds of various kinds which may be used as the ceramic material are as follows: silica, kaolinite, montmorillonite, illite, gibbsite, diaspore, bauxite, hallyosite, dickite, macrite, nontronite, beidellite, hectorite, saponite, bentonite, muscovite, hydromicas, phengite, brammallite, glaucomite, celadonite, olivine, anthophyllite, tremolite, actinolite, chrysolite, forsterite, fayalite, spodumene, lepidolite, amblygonite, petalite, barite, witherite, fluorspar, apatite, baddeleyite, zirkite, zircon, titania, rutile, brookite, quartz, biotite, limonite, vermiculite, aluminum oxide, calcium oxide, magnesium oxide, iron oxide, mullite, tridymite, cristobalite, albite, nephelite, anorthite, magnesite, orthoclase, gypsum, chromite, andalusite, sillimanite, kyanite, pyrophyllite, talc, anatase, thoria, silicon carbide, boron carbide, zirconium carbide, hafnium carbide, tantalum carbide, vanadium carbide, molybdenum carbide, tungsten carbide, niobium carbide, beryllium nitride, boron nitride, aluminum nitride, silicon nitride, cerium sulfide, and thorium sulfide.

Preferred groups among these ceramic materials are silicates, aluminates, titanates, zirconates, aluminosilicates, silicon carbides, and silicon nitrides. Among these, silicates, aluminosilicates and silicon carbides are more preferred. Silicon-containing materials in general are particularly preferred, either as silicates or silicon carbides, either alone or in combination with aluminum-containing materials such as aluminum oxides.

In accordance with the invention, the fabric is impregnated with the continuous ceramic phase by applying the ceramic material to the fabric in liquid form. This is conveniently achieved by dipping the fabric in the liquid, or any other conventional means of impregnation. The liquid may be a solution, suspension or colloidal suspension (for example, sol gels) of the ceramic material, or of a precursor to the ceramic material, in either case one which converts to the desired form upon heating. The heating may involve a fusing of the material, a pyrolysis of the material, or any other physical or chemical change which results in a continuous solid ceramic phase. The precursor may be a polymeric precursor or any other form which undergoes conversion to the ceramic by chemical reaction at elevated temperature. Examples of polymeric ceramic precursors are polysilanes including polycarbosilanes, polysiloxanes, and poly(metallosiloxanes). The liquid vehicle for the solution or suspension may be any conventional solvent or suspending liquid. Common examples are water and organic solvents such as hexane and xylene.

Examples of commercially available materials suitable for use in forming the continuous ceramic phase are as follows:

Sol gel precursors: Nalco 1050, a colloidal suspension of $SiO_2$ particles, approximately 3 nm in size, in water, available from Nalco Chemical Co. Oakbrook, Ill.; Ludox, an $Al_2O_3/SiO_2$ combination in water, available from E. I. du Pont de Nemours & Co., Inc., Wilmington, Del.; and similar materials available from The PQ Corporation, Valley Forge, Pa., and National Starch & Chemical Corp., Bridgewater, N.J.

Polymeric precursors: T, TB and TZ, silicon carbide precursors available from Ethyl Corporation, Baton Rouge, La.; Pyrofine A, Pyrofine S, and Pyrofine P, polymers available from Atochem, Inc., France; and polycarbosilanes available from Nippon Carbon Company, Japan, through Dow Corning, Midland, Mich.

Fillers or other additives may optionally be included with the ceramic materials for purposes of controlling certain parameters to desired levels. These parameters include those of relevance to the impregnation procedure, the honeycomb forming procedure, or the characteristics of the final product, or combinations of these. Such parameters include viscosity, pH, color and density. The fillers may be other ceramic materials, usually in the form of powders or whiskers, clays, or any other additives known among those skilled in the art for similar purposes. One example of a filler, used with a $SiO_2$ gel sol ceramic precursor, is pure mullite at a level of 10% by volume.

The fibers forming the fabric may be any fiber material which is capable of withstanding and remaining stable at high temperatures, notably those on the order of approximately 1000° C. (1832° F.). The actual material is not critical and may include any of the wide variety of materials meeting this description. Such materials include certain nonmetallic elements as well as the metal and nonmetal oxides, borides, carbides, nitrides, sulfides and silicides mentioned above in connection with the continuous ceramic phase. Thus, in addition to the examples cited above for continuous ceramic phase, further examples are asbestos, graphite and other forms of carbon, boron, Fiberglas, and coated materials such as silicon carbide-coated boron, boron carbide-coated silicon, and silicon-coated silicon carbide.

Preferred fiber materials are ceramic materials, particularly silicates, aluminates, titanates, zirconates, aluminosilicates, silicon carbides, and silicon nitrides, as mentioned above in connection with the continuous ceramic phase.

The fibers may be in the form of either woven or non-woven cloth. The cloth may vary widely in terms of surface finish, weight and, if woven, the type of weave. These parameters are not critical and may be selected in accordance with the desired properties of the final product, which may depend on the scale and physical dimensions of the product and its intended use, as well as the procedures selected for use in processing these materials into the final honeycomb shape.

Examples of fibers which are commercially available and may be used in the practice of the invention are Astroquartz, a quartz fiber available from J. P. Stevens & Co., Inc., New York, N.Y.; Nextel 312, Nextel 440 and Nextel 480, mullite-based fibers available from 3M Co., St. Paul, Minn.; aluminum oxide-based fibers from E. I. du Pont de Nemours & Co., Inc., Wilmington, Del., and Sumitomo Chemical Co., Ltd. Osaka, Japan; Nicalon, a silicon carbide fiber available from Dow Corning Corp., Midland, Mich.; and Tyranno, a silicon carbide fiber available from UBE, Japan.

As stated above, the continuous ceramic phase is applied to the fabric in liquid form, as either a solution or a suspension. Various methods of application, as readily apparent to those skilled in the art, may be used, such as for example, dipping, sponging, or spraying. Dipping the fabric in a vessel containing the liquid impregnant is particularly convenient, and the impregnant may be applied to the fabric in single or multiple dips. Multiple dips are a convenient way of controlling or adjusting density and may include liquid phases varying in the solids loading. Successive dips may be performed with intervening heat treatments to remove the liquid vehicle. In the case of sol gels, a mild heat treatment (typically on the order of 40°–50° C. or 104°–122° F.) is used to cause gelation to occur. In the case of polymers, a higher temperature (typically on the order of 1000° C. or 1832° F.) is used to allow the ceramic to set and partially convert between dips. Additional dips may also be performed on the honeycomb structure itself, once the corrugated sheets have been bonded together.

The solids loading in any particular dip and hence the viscosity may vary. Both however will affect both the process and the final product. The optimum loading for any procedure will depend on the number of dips to be performed, the type of ceramic used, the density and weave of the fabric, and numerous other considerations encountered in the process. The appropriate choice will be readily apparent to those skilled in the art. In most applications, best results will be obtained with liquid phases having solids contents within the range of about 10% to about 75% by weight, preferably from about 25% to about 60%. In one particular case involving the use of a polycarbosilane polymer ceramic precursor in hexane solvent, a first dip using a solution of approximately 50% solids content and a viscosity of slightly under 100 centipoise was used, followed by a second dip using a 30–40% solids content and a viscosity of slightly under 50 centipoise. The impregnated sheets were fired in nitrogen at 1000° C. for one hour in between dips. Multiple dips may also be used where fillers are present in the first dip only.

Formation of the honeycomb structure is achieved by conventional means, analogous to methods known for use in manufacturing honeycomb panels of more conventional materials. The ceramic-impregnated fabric sheets or strips are shaped into a corrugated form by conventional shaping equipment. The corrugated sheets are then assembled to form a honeycomb structure by joining adjacent sheets at node lines along their concave surfaces, using a ceramic adhesive material or a solvent capable of dissolving the ceramic material forming the continuous phase to form the bond. Examples of ceramic adhesives are products bearing the name Aremco-Seal, available from Aremco Products, Inc., Ossining, N.Y. Non-sacrificial adhesives may also be used, particularly those that convert to a ceramic upon pyrolysis after curing. Alternatively, the sheets may be bonded together by simply contacting them when the impregnant is still wet, and curing them together, thereby fusing them at the lines of contact.

Once the honeycomb structure is formed, face sheets may be added, again in accordance with known methods previously used for honeycomb panels of other materials. In this case, the same fabric used for the individual sheets of the honeycomb may be used as the face sheets, these sheets being optionally impregnated with the continuous ceramic material as in the honeycomb itself. Conventional ceramic adhesives may again be used to bond the sheets to the honeycomb.

The temperatures used in the various heating steps may vary, depending on the particular step in the sequence, and the type and amount of ceramic material or precursor used. Final curing temperatures in most cases generally range from about 400° C. to about 1000° C.

(752°–1832° F.), preferably from about 500° C. to about 750° C. (534°–1382° F.). The atmosphere in which the heating is performed will be selected on the basis of the materials involved. Inert atmospheres such as nitrogen will be appropriate for certain materials, while air will be sufficient for others.

The following is a description of an illustrative process for preparing ceramic honeycomb in accordance with the present invention. This is not intended to limit the scope of the invention in any manner.

EXAMPLE

Starting materials for the process are prepared by cutting Nextel 440 fabric into 1.5×10-inch strips, and by preparing a slurry by milling together Nalco 1050 silica sol with 15% mullite powder.

The fabric strips are dipped in a bath of the slurry and excess slurry is then wiped off the strips. These impregnated strips (i.e., the "prepreg") are corrugated in accordance with the desired dimensions of a honeycomb structure, and cured at 100° C. to retain the corrugated shape.

A high temperature ceramic-based adhesive, such as for example Aremco 503 with mullite filler or Hexcel preceramic adhesive/binder with mullite filler, is applied to the nodes of the corrugations where the strips will be joined to form the honeycomb, and the sheets are stacked in the honeycomb arrangement. The adhesive is then cured at 100°–300° C., followed by pyrolysis are 1100° C. The resulting honeycomb is then dipped again in the same slurry used initially, and pyrolysis is once again performed at 1100°–1400° C.

Skins (i.e., face sheets) for placement over the honeycomb core are prepared from the same fabric and dipping slurry, and attached to the honeycomb with the same high temperature ceramic-based adhesive.

The foregoing is offered primarily for purposes of illustration. Variations, substitutions and other modifications of the materials and procedures disclosed herein will be readily apparent to those skilled in the art, and do not depart from the spirit and scope of the invention.

What is claimed is:

1. A method for the manufacture of a honeycomb panel stable at high temperatures, comprising:
   (a) impregnating a plurality of sheets of fabric formed of fibers of a material which remains stable at temperatures exceeding approximately 1000° C. with a liquid impregnant comprising a liquid vehicle convertible upon heating to a continuous solid ceramic material and heating the impregnated sheet to evaporate the liquid vehicle;
   (b) shaping said sheets thus impregnated to form corrugations therein while said impregnant is in liquid form;
   (c) heating said sheets thus impregnated and shaped to at least partially convert said impregnant to said solid ceramic material; and
   (d) bonding said sheets together in an open cellular arrangement.

2. A method in accordance with claim 1 in which said fiber material is a ceramic material.

3. A method in accordance with claim 1 in which said fiber material and said continuous ceramic phase are each comprised of silicon-containing ceramic materials.

4. A method in accordance with claim 1 in which said liquid impregnant is a liquid solution of a polymeric ceramic precursor.

5. A method in accordance with claim 1 in which said liquid impregnant is an aqueous solution of a polymeric ceramic precursor.

6. A method in accordance with claim 1 in which said liquid impregnant is a liquid colloidal suspension of a ceramic material.

7. A method in accordance with claim 1 in which said liquid impregnant is an aqueous colloidal suspension of a ceramic material.

8. A method in accordance with claim 1 in which step (a) comprises dipping said sheets in a vessel containing said said liquid impregnant, followed by removing said sheets from said vessel.

9. A method in accordance with claim 1 in which said continuous ceramic phase is comprised of at least one member selected from the group consisting of silicates, aluminates, aluminosilicates and silicon carbides.

10. A method in accordance with claim 1 in which said fiber material is a ceramic material comprised of at least one member selected from the group consisting of silicates, aluminates, aluminosilicates and silicon carbides.

11. A method in accordance with claim 1 in which said fiber material and said continuous ceramic phase are each comprised of at least one member selected from the group consisting of silicates, aluminates, aluminosilicates and silicon carbides.

12. A method in accordance with claim 1 in which said fiber material is a ceramic material comprised of an aluminosilicate, and said continuous ceramic phase is comprised of a member selected from the group consisting of silicates, aluminosilicates and silicon carbides.

13. A method in accordance with claim 1 in which said fiber material is a woven cloth.

* * * * *